United States Patent [19]

Pollner et al.

[11] Patent Number: 4,911,604
[45] Date of Patent: Mar. 27, 1990

[54] AIRCRAFT TOWING VEHICLE HAVING STEERED NOSE WHEEL LIFTING MECHANISM

[75] Inventors: Juergen Pollner, Munich; Gregor Trummer, Aschering; Peter Moelzer, Schawbhausen, all of Fed. Rep. of Germany

[73] Assignee: Krauss Maffei AG, Munich, Fed. Rep. of Germany

[21] Appl. No.: 250,285

[22] Filed: Sep. 28, 1988

[30] Foreign Application Priority Data

Sep. 28, 1987 [DE] Fed. Rep. of Germany ....... 3732664

[51] Int. Cl.⁴ .................. B64F 1/22; B62D 49/02; B60P 3/11
[52] U.S. Cl. .................. 414/428; 414/430; 414/917
[58] Field of Search .................. 414/426–430, 414/458, 459, 917

[56] References Cited

U.S. PATENT DOCUMENTS

| | | | |
|---|---|---|---|
| 3,049,253 | 8/1962 | Cabral | 414/428 |
| 3,586,187 | 6/1971 | Wright | 414/428 |
| 4,225,279 | 9/1980 | Boyer | 414/428 |
| 4,375,244 | 3/1983 | Morin | 414/429 X |
| 4,632,625 | 12/1986 | Schuller et al. | 414/429 |
| 4,655,670 | 4/1987 | Högberg et al. | 414/426 X |
| 4,810,157 | 3/1989 | Schopf | 414/429 |

FOREIGN PATENT DOCUMENTS

| | | |
|---|---|---|
| 3327628 | 2/1985 | Fed. Rep. of Germany. |
| 3327629 | 2/1985 | Fed. Rep. of Germany. |
| 3534045 | 4/1987 | Fed. Rep. of Germany. |
| 2454409 | 4/1979 | France. |

*Primary Examiner*—David A. Bucci
*Attorney, Agent, or Firm*—Townsend & Townsend

[57] ABSTRACT

An aircraft towing vehicle is equipped with an aircraft nose wheel lifting and securing mechanism. The nose wheel is received in a U-shaped recess of the vehicle chassis, the lifting mechanism being constructed to grip the wheel from behind and underneath and to then push it up a ramp. The tilt angle of the lifting mechanism as it advances towards the wheel is controlled by a steering linkage such that the lower, freely movable segment of the lifting mechanism is tilted farther forward and beneath the nose wheel at the beginning of the nose wheel engaging operation, while conversely, a rigid upper segment is tilted farther forward as the engaging operation continues to completion.

9 Claims, 8 Drawing Sheets

AIRCRAFT TOWING VEHICLE HAVING STEERED NOSE WHEEL LIFTING MECHANISM

BACKGROUND OF THE INVENTION

The invention relates to aircraft towing vehicles.

A previously tested prototype of a towing vehicle of the general type under consideration herein, which was reported in the media, has a lifting mechanism tiltably mounted on a carrier that is pivotable at its front end. As a result, the mechanism can readily adjust itself to the contour of a nose wheel as it approaches the latter. However, this adjustment of the lifting mechanism is achieved only partially and over only a small angular extent of the wheel for nose wheels having widely varying diameters. This observation applies also to the towing vehicle disclosed in German Patent Publication DE-OS No. 35 34 045, but never actually built, in which the lifting mechanism according to FIG. 5 is also tiltably mounted on an advancing lever for the mechanism, while, according to FIG. 3, the lifting mechanism is constructed as a flat roller plate that has only point contact with the nose wheel.

Ideally, when engaging the nose wheel, the lifting mechanism should grip it at the lowest possible point to convert the advancing force applied to the mechanism as effectively as possible into a wheel lifting thrust. After securing the wheel, however, the mechanism should engage the wheel at as high a point as possible so that it effectively cooperates with the wheel hold-down device to prevent relative movement of the nose wheel in an upward direction. Prior art lifting mechanism fail to meet these requirements, especially when they are adapted for use with nose wheels of widely varying diameters.

SUMMARY OF THE INVENTION

An object of the invention is to provide an improved aircraft towing vehicle with a lifting mechanism that can be used with aircraft nose wheels having widely varying diameters, which contacts the nose wheel at a relatively low point during the wheel engaging operation, but which, thereafter, secures the nose wheel by contacting the wheel at a relatively high point.

These objectives are achieved by positively controlling the tilt angle of the lifting mechanism, of lifter, as the nose wheel is being engaged so that a relatively flat, lower portion of the lifter initially contacts the nose wheel. As the lifter is advanced to fully engage the nose wheel, it is tilted into an increasingly inclined orientation so that progressively higher portions of the mechanism contact the nose wheel as the nose wheel engaging operation progresses. The steadily increasing tilt of the lifter is especially pronounced as the lifter approaches the end of its travel path and, therefore, is particularly effective for securing nose wheels of relatively smaller diameters.

In a particularly advantageous embodiment of the present invention, the lifter has a vertical extent which is less than the diameter of the smallest nose wheel that is normally engaged by the vehicle and larger than half the diameter of the largest nose wheel. Further, the lifter is constructed so that it contacts the nose wheel over a portion of its periphery extending to a point located above the nose wheel axle.

DESCRIPTION OF THE PREFERRED EMBODIMENTS

Figure 1:
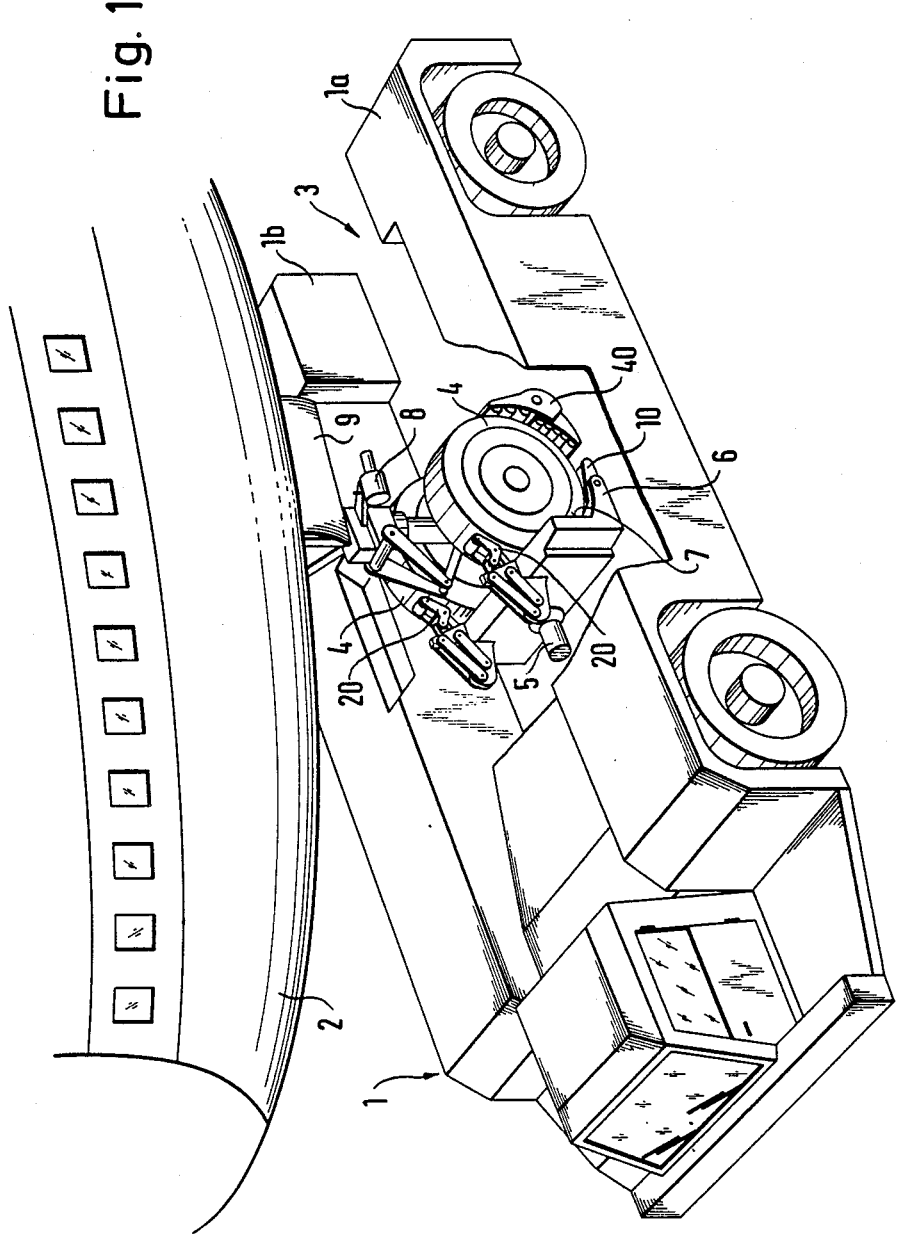
FIG. 1 is a fragmentary, perspective view of a towing vehicle constructed in accordance with the present invention and pulling an aircraft.

FIG. 1 schematically shows a towing vehicle 1 hauling an aircraft 2. Towing vehicle 1 has a bifurcated chassis defined by two side arms 1a, 1b which form between them a rearwardly opening well or recess 13. In use the towing vehicle is maneuvered rearwardly towards a waiting aircraft until the aircraft's nose wheels and the associated undercarriage are disposed within recess 3. The aircraft nose wheels 4 are now engaged by the lifting and securing mechanism of the present invention, lifted off the ground, and secured or locked to the towing vehicle. FIG. 1 shows a simplified embodiment of the lifting and securing mechanism in side perspective with side arm 1a broker partially away to provide a better view of the mechanism. The mechanism has the following main components:

An abutment 6 pivotally mounted on a longitudinally oriented shaft 5. The abutment includes a vertically oriented, rearwardly facing stop plate 7 for the nose wheels 4.

A ramp 10 for supporting nose wheels 4 which is connected to abutment 6 and which is pivotable about a horizontal axis.

Two holders 20 which are pivotally attached to abutment 6. Each holder engages a nose wheel 4, generally from the front and above. A hydraulic actuator forces each holder generally downwardly against the periphery of the associates wheel.

A lifting mechanism or lifter 40 that can be moved generally forwardly (to the left as seen in FIG. 1) into engagement with an aft portion of each wheel to push the wheel up ramp 10, and then forcing the wheel with a predetermined force against stop plate 7.

These mechanisms, of which only the main features are shown in FIG. 1, are described in greater detail below.

FIG. 1 also shows equipment that forms part of the nose wheel undercarriage and is located immediately above the nose wheels 4 such as a hydraulic steering cylinder 8 and a landing gear door 9. It is absolutely essential that the nose wheel lifting and securing mechanism be constructed so that no part of the aircraft, including the above-mentioned components, can be damaged even in the event of a malfunction or mishandling of the towing vehicle and/or its nose wheel lifting and securing mechanism.

Figure 2:
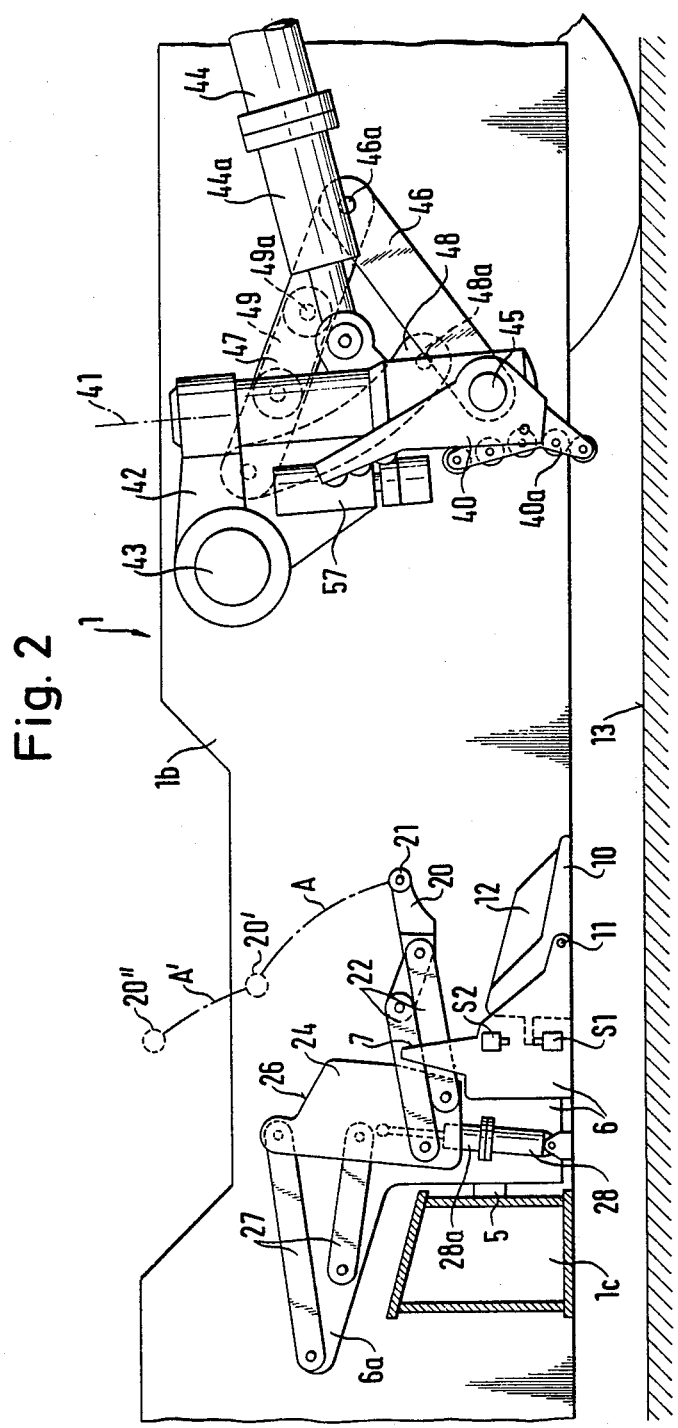
FIG. 2 is a schematic side elevational view, in section, through the nose wheel lifting and securing mechanism of the vehicle shown in FIG. 1.
Figure 3:
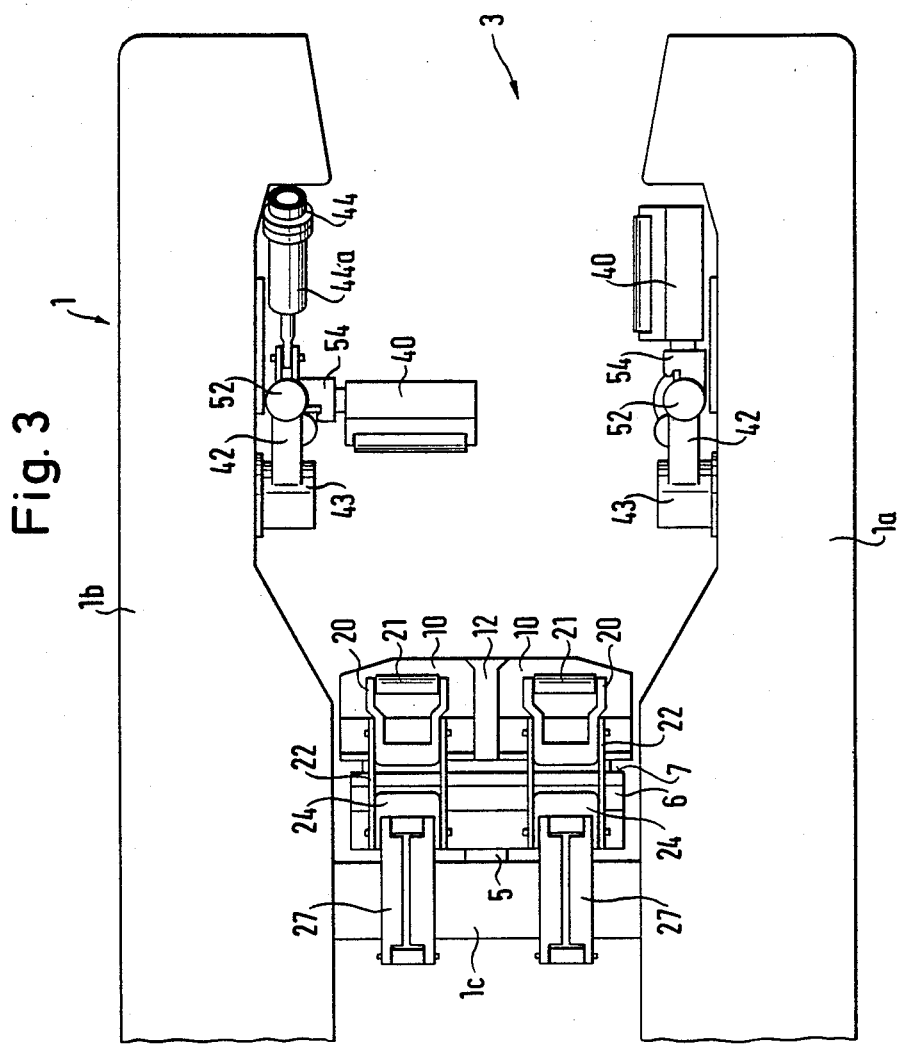
FIG. 3 is a plan view of the lifting and securing mechanism shown in FIG. 2.

FIG. 2 shows in a side elevational view the part of the lifting mechanism affixed to the right side arm 1b. FIG. 3 is a plan view of the entire lifting and securing mechanism.

Abutment 6 and its associated stop plate 7 are pivotable about a longitudinally extending, horizontal shaft 5 mounted to a cross beam 1c of the towing vehicle. Ramp 10 is pivotable about transverse, horizontal shaft 11 and it is disposed aft (to the right as seen in FIG. 2) of abutment 6. Ramp 10 has a shovellike, upwardly concave (on the side facing the nose wheel) or angled profile. It includes a front section (immediately to the left of shaft 11 in FIG. 2) which is steeper or more vertically inclined than the rear section. The ramp may be fitted with a centering rib 12 that extends in between the nose wheels to assist in aligning the nose wheel undercarriage with the center of the towing vehicle aircraft.

FIG. 2 shows ramp 10 in its rest position in which the ramp's lower (aft) surface is substantially parallel to runway 13, and does not extend below the chassis of the towing vehicle so as to not reduce its ground clearance. To engage the nose wheels ramp 10 is tilted in a clockwise direction out of its rest position shown in FIG. 2 into a wheel receiving position in which its aft edge is proximate to, e.g., spaced only a short distance above runway surface 13. As the nose wheels ride up on ramp 10 it is tilted in a counterclockwise direction, past its rest position shown in FIG. 2, to a holding position in which the ramp fully supports the nose wheel undercarriage.

Each holder 20 includes at its free end a roller 21 supported by a pair of parallel links 22 pivotally mounted to a carrier 24. The carrier 24 in turn is supported by two guide arms 27 which are pivotally attached to a forwardly projecting bracket 6a of abutment 6. A hydraulic hold-down actuator 28 is pivotably attached to the vehicle chassis and, upon activation, exerts a downward force onto carrier 24. The upper portion of carrier 24 forms a stop surface 26 which limits the movement path of holder 20 supported by links 22. The entire mechanism is constructed so that it moves, when a nose wheel riding up on ramp 10 from its rearward most position, as shown in FIG. 2, applies a force against the holder, along an initial arc A to position 20' as guided by links 22. At this point, holder 20 abuts contact surface 26 of carrier 24. In the next, second phase of the wheel engaging operation the holder 20, together with carrier 24, move along a second arc A' into their uppermost position 20' under the guidance of arms 27.

The above described components of this mechanism are dimensioned and arranged so that nose wheels of the relatively larger aircraft types can be engaged. Of the larger commercial aircraft in use today, the Boeing 757 exhibits the smallest nose wheel diameter, i.e. 31 inches (79 cm) while the Boeing 747 has the largest nose wheel diameter of about 49 inches (124 cm). with other conventional commercial aircraft, e.g. the Boeing 767, DC 8, DC 10, the Airbus A-300 and A310 having nose wheel diameters between these extremes. At its lowest position, shown in FIG. 2, roller 21 of holder 20 is located 62-79 cm above the surface of runway 13, which is less than the diameter of the smallest nose wheel, but higher than half the diameter of the largest nose wheel of the above mentioned aircraft types. Further, holder 20 is located above the aft edge of ramp 10, and to the rear of ramp pivot shaft 11.

When so arranged, holder 20 contacts the forward upper quadrant of the nose wheel's periphery, irrespective of the wheel diameter, when the wheels are first engaged by the ramp. It is then forced upwardly by the wheels as they travel up ramp 10. At no point prior to or during the engaging phase does the holder extend above the uppermost extent of the nose wheel periphery where it might cause damage to the steering cylinder, the nose wheel door or other components of the nose wheel under carriage.

Directly opposite the holder 20, ramp 10 and stop plate 7 is a lifting mechanism or lifter 40. The lifter is defined by two sets of rollers, a movable lower segment and a fixed upper segment which are described in further detail below. Each lifter 40 is mounted to a rocker arm 42 and can be pivoted about a substantially vertical axis 41. The rocker arm 42 in turn is journaled in a horizontally oriented bearing 43 mounted to a corresponding side arm, e.g. arm 1b of the vehicle chassis. A hydraulic actuator 44 is provided for moving lifter 40 from its rearwardmost position, shown in FIG. 2, forwardly toward ramp 10 and stop plate 7 to thereby push an aircraft nose wheel up the ramp 10. Each lifter 40 on the associated rocker arm 42 can also be tilted about a generally upright axis 45.

While hydraulic actuator 44 pushes rocker arm 42 and lifter 40 forward, the tilt angle of the lifter is controlled by a linkage formed by a control arm 46, a link 47 and two guides 48,49. The upper ends of the guides are connected to link 47 while their lower ends are attached to bearings 48a, 49a mounted to side arm 1b of the vehicle chassis. Link 47 and guides 48,48, which define a four-point control linkage, guide pivot 46a of control arm 46 as lifter 40 is pushed forwardly along an arcuate, initially descending but then ascending path B. Especially at its forward portion this path is steeper than a circular path.

A hydraulic motor 57 is mounted to rocker arm 42 for pivoting lifter 40 about axis 41 into its nonoperating or retracted position in which the lifter is proximate, i.e., effectively parallel to the wall of chassis side arm 1b. This is best seen in FIG. 3 where the left hand lifter 40 (in the direction of forward movement of the vehicle, i.e., to the left as shown in FIG. 3) mounted to the left side arm 1a is shown in its retracted position. When approaching the nose wheel undercarriage, it is of course necessary that both lifting mechanisms are in their retracted positions so that the nose wheel undercarriage can pass uninhibited into chassis recess 3. Only thereafter are the lifters pivoted into their operative positions to engage each nose wheel from behind.

Figure 4:
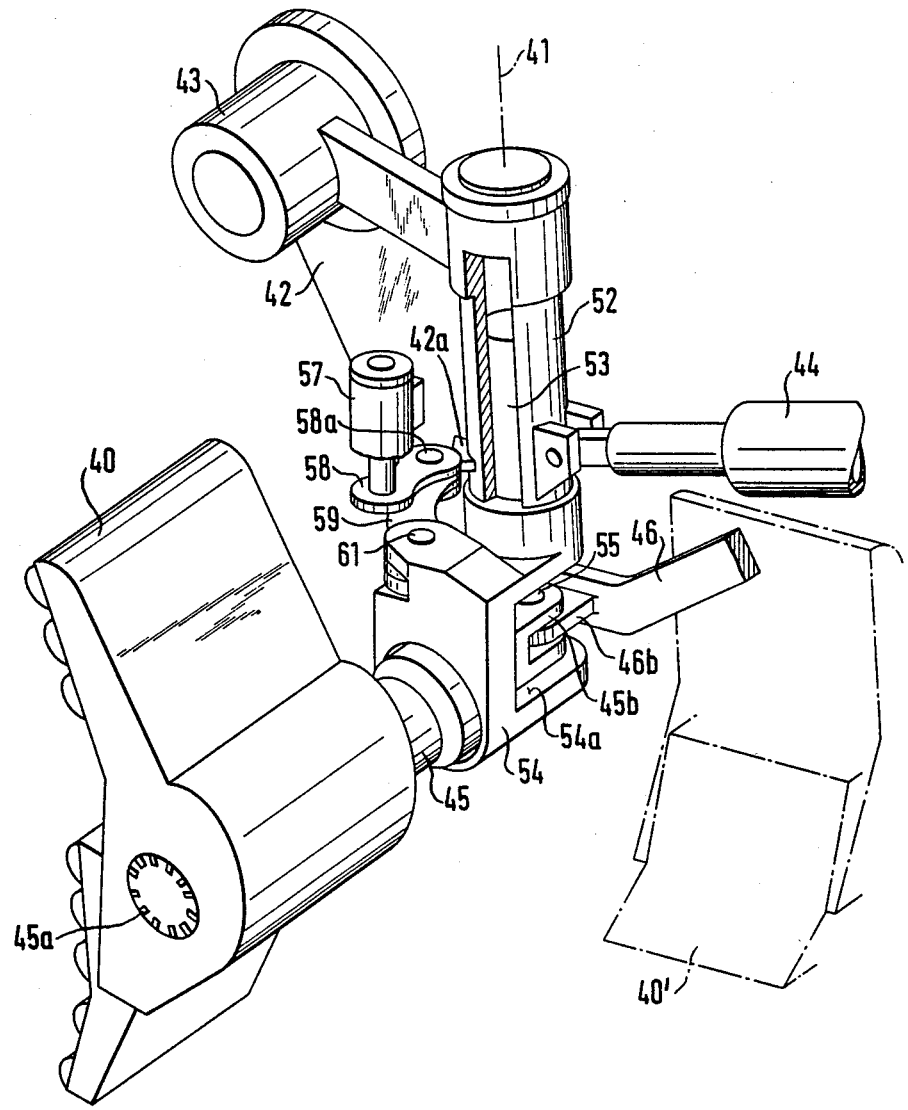
FIG. 4 is a fragmentary, elevational perspective view of the lifting mechanism shown in FIG. 2 and illustrates associated mounting supports and power drive.

The mounting of and power drives for lifter 40 are illustrated in greater detail in FIG. 4. Rocker arm 42 is pivotable about a horizontal axis defined by a bearing 43 which is secured to the vehicle chassis. The rocker arm includes a sleeve bearing 52 which journals a vertical shaft 53 of a support 54 for the lifter so that the shaft can pivot about the vertical axis 41. The support rotatably mounts a further, horizontal shaft 45 to which lifter 40 is immovably keyed with radial teeth 45a. Support 54 includes a cutout 54a, on the side of the bearing for shaft 45 opposite lifter 40, into which a bifurcated end 45b of shaft 45 extends. This bifurcated end of the shaft is pivotally coupled to a lug 46b of control arm 46 with a pivot pin 55 that is coaxial with the vertical axis 41 of sleeve bearing 52. Thus, control arm 46 rotates with shaft 45 about the horizontal axis of the latter so that it can be employed for controlling pivotal movements of shaft 45 with respect to support 54 for lifter 40 when hydraulic actuator 44 pivots rocker arm 42, together with lifter 40 about the axis of bearing 43. Further, the pivotable connection between control arm 46 and shaft 45 enables support 54 and lifter 40 carried thereby to pivot about axis 41 of sleeve bearing 52 so that the lifter can be pivotally moved into its retracted position 40, illustrated by broken lines in FIG. 4.

This pivotal motion is generated by a hydraulic motor 57, mounted to rocker arm 42, which drives a crank arm 58 having a free end pivotally connected with a pin 58a to a push bar 59. The push bar in turn is pivotably attached to support 54 with another pin 61. When lifter 40 is in its operating position as shown in FIG. 4, crank arm 58 abuts a detent 42a on rocker arm 42 to prevent the clockwise rotation of the carrier about axis 41 past its operating position. Push bar 59 extends from pivot 58a to pivot 61, on the right side of hydraulic motors 57 as seen in FIG. 4, when support 54 and the lifter are in their operating position. As a result, a rearwardly oriented force generated when lifter 40 contacts a nose wheel during its initial engagement by and subsequent securing to ramp 10 and the lifter results in a clockwise moment in crank arm 58 that is absorbed by detent 42a. The lifter is thereby mechanically locked into its operating position.

The lifter is returned to its retracted position by activating hydraulic motor 57 to rotate crank arm 58 counterclockwise from its position shown in FIG. 4, that is away from detent 42a, until the longitudinal axis of push bar 59 has moved past, i.e., has crossed the axis of hydraulic motor 57. In the illustrated embodiment crank arm 58 must pivot through more than 180 degrees to pivot support 54 through 90 degrees and thereby return lifter 40 to its retracted position. In this position pivot 58a at the free end of the crank arm has substantially moved to where pivot 61 on support 54 is shown in FIG. 4.

Vertical axis 41 has a slight forward inclination so that lifter 40 rises somewhat as it pivots into its retracted position. This prevents the lower edge of lifter 40 from reducing the vehicle's ground clearance. In its operating position, however, the lifter may without adverse effects extend below the underside of the vehicle chassis prior to and during the engagement of the nose wheel.

Figure 5:
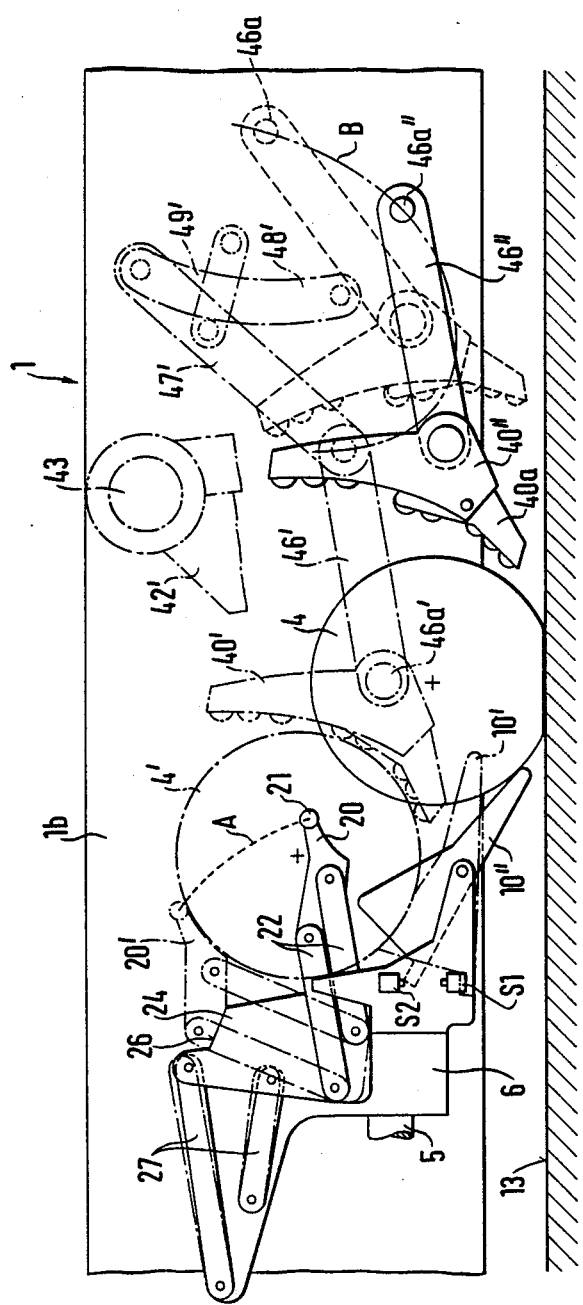
FIG. 5 is a multi-phase illustration of the lifting and securing mechanism as it engages and secures an aircraft nose wheel having a relatively small diameter.

FIG. 5 schematically shows various operating positions of the lifter and the holding mechanism as a nose wheel is being engaged and secured. The drawing illustrates a nose wheel having a diameter at the low end of the range of nose wheel diameters of common commercial aircraft for which the towing vehicle is intended. The range of diameters, as mentioned above, is from about 30 inches (75 cm) to about 50 inches (125 cm) and ranges from the Boeing 757 (nose wheel diameter 31") at the lower end of the spectrum to the Boeing 747 (nose wheel diameter 49") at the higher end. The lifter and holding mechanism must be constructed to receive all nose wheels falling in this size range effectively and without risk of damage. Once a wheel is received, it must further be firmly secured to prevent the possibility of an accidental release of the wheel.

In the operation lifter 40 is initially in its retracted position. The towing vehicle is maneuvered backwards towards the parked aircraft until the nose wheel enters the U-shaped recess of the vehicle chassis and contacts the aft edge of ramp 10. The impact of the wheel against ramp 10 tilts the ramp downwardly into position 10", shown in solid lines in FIG. 5. Ramp 10 thereby activates a limit switch S2 which generates a signal that is used to disengage the towing vehicle's drive, at least for reverse operation to prevent the vehicle from backing into and possibly damaging nose wheel 4. In addition, the signal from switch S2 activates the power drives 57,44 for lifter 40. The operator can then engage the power drives by means of a control lever. As long as limit switch S2 has not been activated as a result of contact between nose wheel 4 and ramp 10, the power drives are inoperative to prevent the unintended activation of the lifter.

When the power drives are activated, hydraulic motor 57 first pivots each lifter 40 from its retracted into its operating position. Each hydraulic actuator 44 is then energized with hydraulic fluid to force the associated piston rod outward. In this manner, lifter 40 and angularly fixed control arm 46 are advanced from their starting position, indicated by broken lines in FIG. 5, to an intermediate position 40", 46" shown in solid lines, in which the rollers of lifter 40 abut nose wheel 4 while the lower, tiltably mounted roller segment 40a of the lifter pivotally adjusts itself to the periphery of the nose wheel actuator. As the piston rod continues to move out of hydraulic actuator 44, lifter 40 pushes nose wheel 4 onto and up ramp 10. While this takes place the nose wheel also contacts holder 20 and, as the wheel rides up ramp 10, the holder, guided by links 22, moves along arcuate path A. The point of contact between the holder and the nose wheel will consistently be in the forward upper quadrant of the nose wheel's periphery, typically between about 30-60 degrees from the wheel's apex. Before the nose wheel reaches position 4', illustrated by broken lines, holder 20 will have engaged contact surface 26 of carrier 24, hence pushing the carrier, as guided by arms 27, upward and simultaneously withdrawing the piston rod of the hydraulic hold-down actuator 28 out of the associated hydraulic cylinder.

As nose wheel 4 is travels up ramp 10 its center of gravity will traverse the axis of shaft 11. The ramp will tip forwardly, and by the time nose wheel 4 abuts stop plate 7, the ramp has reached its raised position 10'. During this phase hydraulic actuator 44 has advanced lifter 40 into position 40' shown in broken lines. The free end 46a of control arm 46 coupled to lifter 40 prescribes a path which descends initially and then rises sharply along the illustrated arc B. In FIG. 5 broken lines illustrate the final positions of lifter 40', control arm 46', link 47', and guides 48', 49', which together comprise a steering or control linkage, as well as the end position of rocker arm 42', which carries lifter 40 and is mounted to bearing 43.

The guidance of control arm 46 by the control linkage causes lifter 40 to initially tilt slightly rearwardly, as it is pivots forwardly, so that its lower segment 40a reaches or extends as far as possible beneath the nose wheel. At the terminal portion of the forward pivot lifter 40 tilts sharply forward so that its rigid upper segment abuts the nose wheel periphery, or is at least in close proximity to the wheel where it functions, together with holder 20, as a barrier which secures the nose wheel in position and prevents it from further moving in an upward direction. When the nose wheel first contacts stop plate 7 and ramp 10 has tilted into its raised position, a limit switch S1 is activated. It generates a signal that is used to apply hydraulic fluid of a controlled pressure to hydraulic actuators 44 and 28 (cf. FIG. 2; not shown in FIG. 5) to thereby apply forces of a predetermined and controlled magnitude to the lifter 40 and holder 20 which in turn are applied against the nose wheel periphery. This assures that the nose wheel is firmly secured in position irrespective of the prevailing tire pressure, the degree of wear and/or the quality of the tire surface.

Once the nose wheel is secured, a piston rod clamp 44a of hydraulic actuator 44 is engaged to thereby mechanically lock the piston rod in the set position. Hydraulic actuator 28 is locked in its set position by sealing the pressurized hydraulic fluid in its cylinder so that it continues to act on its piston. These operations are sequenced automatically once the driver of the towing vehicle has activated the power drives for the lifter.

If a malfunction is encountered after the nose wheel has been secured, e.g. during towing of the aircraft, say if the air pressure in the tire of the nose wheel suddenly drops, the sealed in pressure in actuator 28 automatically lowers the holder. This, however, leads to an immediate pressure reduction in the actuator which is detected by a pressure sensor and triggers an alarm signal warning the driver to stop the towing vehicle. Further, as the holder moves towards the axis of the deflating nose wheel, a piston rod clamp 28a of hydraulic actuator 28 is released to arrest the further retraction of the piston rod after a piston movement of only a few mm. Thus, the nose wheel remains firmly secured despite the malfunction.

Figure 6:
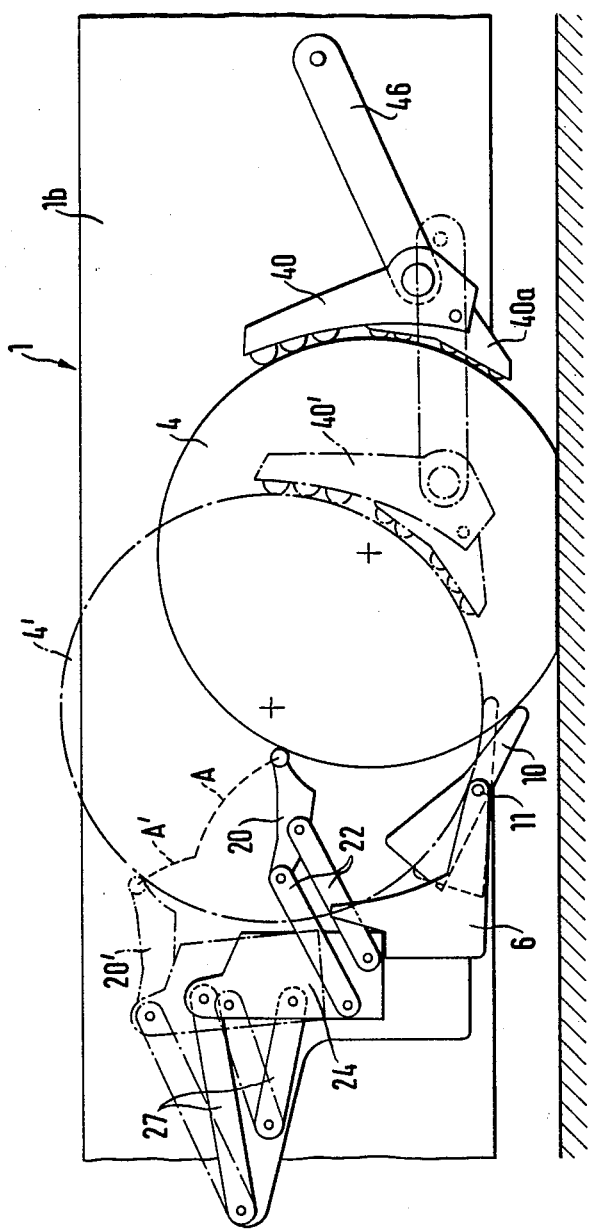
FIG. 6 is a multi-phase illustration, similar to FIG. 5, of a lifting and securing mechanism as it engages and secures an aircraft nose wheel having a relatively large diameter.

FIG. 6 shows, similar to FIG. 5, the various positions of a nose wheel that is being engaged and secured but which has a large diameter wheel with respect to the range of nose wheels cited above, e.g. the nose wheel of a B 747 aircraft having a wheel diameter of about 49". The nose wheel shown in solid lines is positioned on the tip of ramp 10 after it tilted the latter downwardly. Holder 20 touches the nose wheel periphery, while lifter 40 has made peripheral contact with the nose wheel after having been pivoted forward from its retracted position but before it has been significantly tilted rearwardly by control arm 46. As the lifter continues to advance forward, pushing the nose wheel 4 onto ramp 10, it is tilted increasingly rearwardly, i.e. in a clockwise direction as seen in FIG. 6, by control arm 46. This forces the freely pivoting lower segment 40a of the holder increasingly further beneath the nose wheel. At the same time holder 20 travels along the prescribed arc A, guided first by links 22 and then by arms 27, all the while shifting its peripheral contact point on wheel 4 only slightly to maintain a position on the wheel at an angle of between about 30–60 degrees from the wheel's apex. As a result of the larger wheel diameter, carrier 24 moves upwardly a substantially greater distance as compared to the distance it travels with wheels of smaller diameter as shown in FIG. 5. Similarly, because of the larger wheel size the lifter shown in FIG. 6 at position 40' has traveled only about half the distance between lifter positions 40' and 40" shown in FIG. 5.

For the sake of clarity FIGS. 5 and 6 were drawn as if nose wheel 4 together with the entire aircraft were pulled forward. In fact, however, the aircraft remains stationary during the entire receiving and loading operation while the forward pressure exerted by lifting mechanism 40 against nose wheel 4 causes the towing vehicle to move backwards (i.e. to the right as seen in FIGS. 5 and 6), sliding ramp 10 underneath the nose wheel and thereby pushing the nose wheel upwardly. However, any attempt to illustrate the reverse motion of the tow vehicle would render the drawing unnecessarily complex and unclear. Instead the relative positions of components shown in FIGS. 5 and 6 have been drawn as if the towing vehicle remained stationary.

When the nose wheel is first engaged, lifter 40 bears substantially the entire dead weight resting on the nose wheel and, in addition, it must generate the necessary force to lift the nose wheel off the ground. It is therefore essential that hydraulic actuator 44 generates a very large force which is achieved by applying a correspondingly large hydraulic pressure to the actuator. As the engaging operation proceeds, however, in increasing proportion of the nose wheel dead weight is transferred to ramp 10, especially after the latter has tilted about its pivot axis into its raised position. The force that must be generated by lifter 40 and the magnitude of hydraulic pressure in actuator 44 decreases accordingly.

Figure 7:
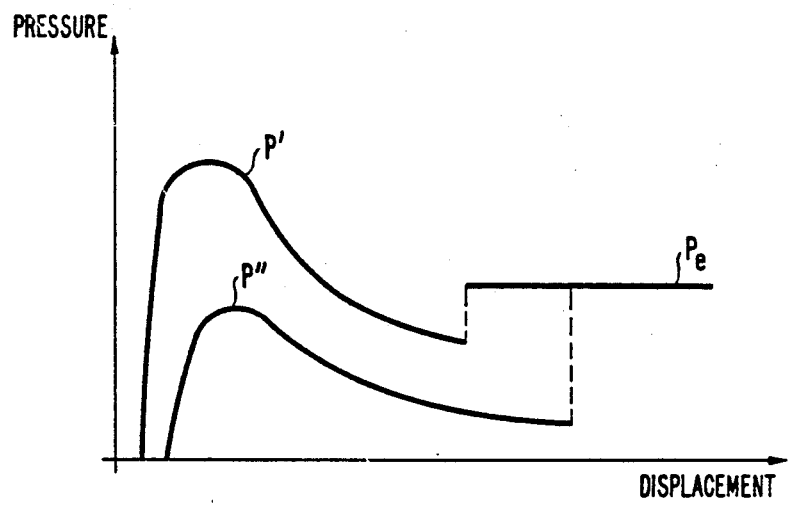
FIG. 7 is a graph illustrating as a function of elapsed time the pressure gradient within a hydraulic cylinder of the lifting mechanism as it engages a nose wheel.

FIG. 7 illustrates schematically the pressure gradient P prevailing in hydraulic actuator 44 as a function of the distance traveled by lifter 40. Upper curve P' shows the pressure gradient for an aircraft with a large nose wheel diameter, as shown in FIG. 6, supporting a correspondingly greater dead weight. Lower curve P" shows the pressure gradient for an aircraft with a relatively smaller nose wheel diameter, as shown in FIG. 5, supporting comparatively lesser dead weight. The two curves of FIG. 7 are merely approximations and it should be understood that no direct correlation necessarily exists between a given aircraft's dead weight and the nose wheel diameter.

The shape of curves P' and P" is also a function of the relative dimensions and geometry of the components of the steering linkage which controls the movement of lifter 40. These are selected so that the force generated on lifting mechanism 40 during the final stages of the engaging operation, even for wheels subjected to the largest dead weight, and therewith the magnitude of the hydraulic pressure in actuator 44, is lower than the predetermined wheel clamping force, and the clamping pressure Pe required to achieve this force that is to be exerted on the nose wheel when it is in its secured position. This is a necessary prerequisite that, in accordance with the present invention, the pressure in hydraulic actuator 44 can be increased to the clamping pressure Pe following the nose wheel engaging operation. The magnitude of the clamping pressure is independent of the nose wheel diameter and it is selected so that it is sufficient to firmly secure the nose wheel in position and minimize vibrations and relative nose wheel movements which are necessarily encountered during towing as a result of the elasticity of the tires. Conversely, the clamping pressure Pe applied to the actuator is selected so that the clamping force acting on the nose wheel cannot damage it or flatten the tire against the rim. Experiments have shown that the clamping pressure Pe should be selected so that clamping force of about 2 tons is exerted on the nose wheel.

Figure 8:
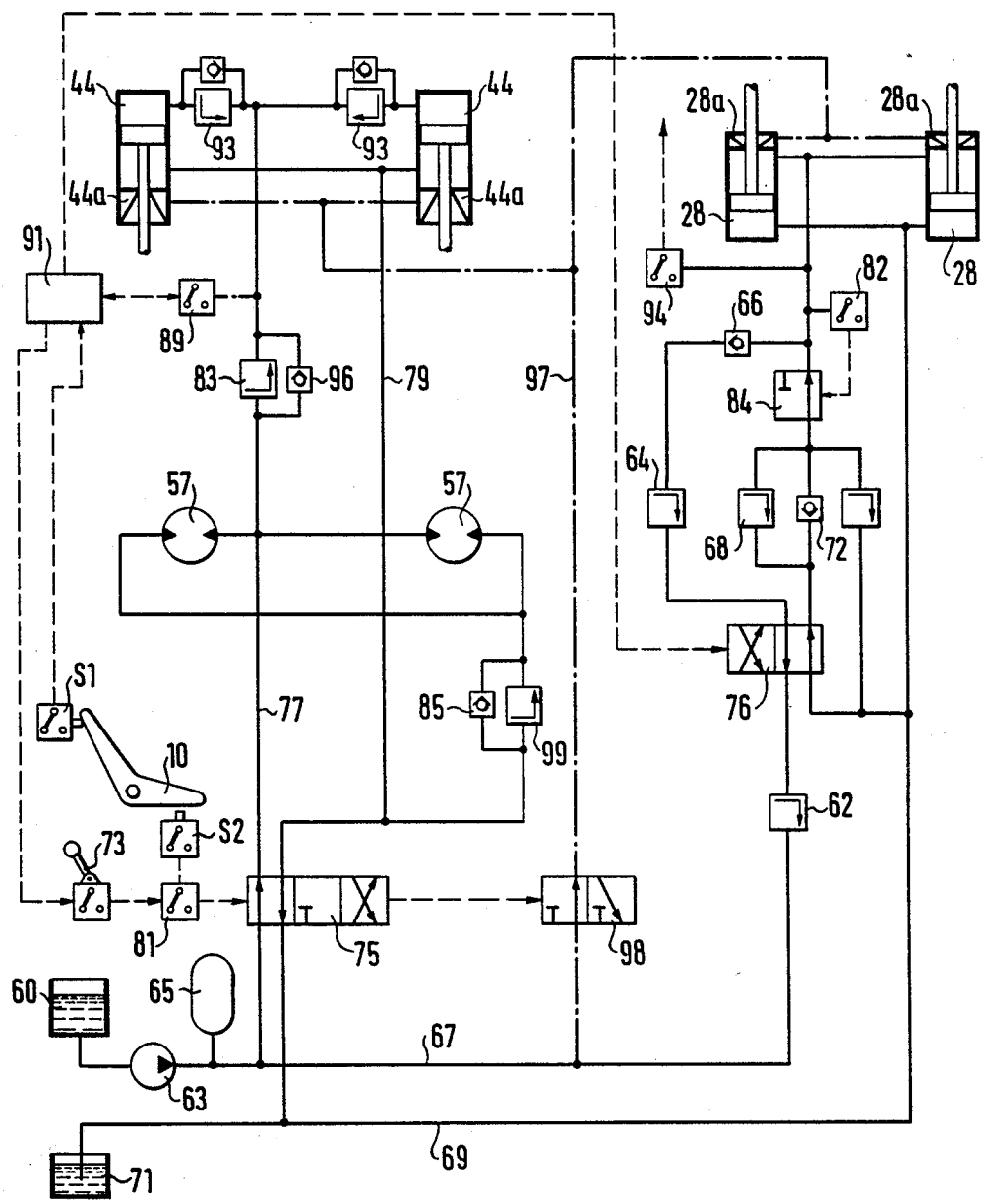
FIG. 8 is a simplified diagram of the hydraulic and electrical circuits for the lifting and securing mechanism of the present invention.

FIG. 8 is a simplified diagram of the electrical and hydraulic circuits employed by the nose wheel lifting and securing mechanisms of the present invention. Hydraulic conduits are shown in dark, solid lines, hydraulic control lines are shown in dot-dash lines, and the circuitry for electric signals are shown in broken lines.

Actuator 28 and 44 and motor 57 for the lifter and the holder are all hydraulically operated. Pressurized hydraulic fluid flows from a source that includes a feed reservoir 68, a pump 63 and, if needed, a pressure tank 65, into a pressure line 67.

The driver of the towing vehicle can manually operate a lever 73 to electrically open a valve 75 for directing pressurized hydraulic fluid to the hydraulic motors 57 and hydraulic actuators 44. The valve can only be engaged after the towing vehicle has properly abutted the nose wheel and tipped ramp 10 downwardly, thereby activating limit switch S2 enabling valve 75 via a relay 81. When set as indicated in FIG. 8, valve 75 permits the flow of pressurized hydraulic fluid through hydraulic line 77 to hydraulic motors 57. The motors then pivot the lifters through 90 degrees into their operating positions (cf. FIG. 4). Spent hydraulic fluid from motors 57 flows through a check valve 85 and a hydraulic line 79 into return line 69.

While the lifters are pivoted, the pressure in hydraulic motors 57 is less than the threshold pressure of a pressure release valve 83 so that the valve prevents the flow of hydraulic fluid to the hydraulic actuator 44. When the hydraulic motors 57 have stopped rotating, i.e., when the crank arm 58 shown in FIG. 4 contacts detent 42a, the pressure in line 77 increases which opens pressure valve 83. This allows pressurized hydraulic fluid to enter the cylinders of hydraulic actuators 44, forcing the piston rods outwardly and pivoting lifters 40 forward about bearings 43 until the rollers or the lifters contact the nose wheels. During this phase of the operation the hydraulic medium on the other sides of the pistons can exit from actuators 44 into hydraulic line 79.

The continuing extension of the piston rods of actuator 44 causes lifter 40 to push the nose wheel up ramp 10 towards stop plate 7 so that the ramp eventually tilts forward into its raised position. Due to the dimensional relationship of the various components the hydraulic pressure inside actuators 44 decreases during this portion of the wheel engaging operation. Before the nose wheel contacts stop plate 7, ramp 10 activates a limit switch S1. The signal generated by switch S1 is applied to a switching unit 91 which in turn activates a pressure switch 89 set for a predetermined threshold pressure Pe. Since the nose wheel 4 cannot move further once it is in contact with stop plate 7, the hydraulic pressure in actuator 44 rises sharply. This pressure rise is sensed by pressure switch 89. When signals are emitted by both switches S1 and 89, switch unit 91 closes valve 75, thereby completing the engaging and nose wheel lifting operation. A check valve 93 in fluid communication with the cylinders of hydraulic actuators 44 causes the retention of the pressure in the cylinder which prevailed when pressure switch 89 was activated, thereby setting the clamping pressure Pe.

During the nose wheel engaging operation the piston rod clamp associated with each hydraulic actuator 44 is held open, i.e., it is deactivated by the pressure in hydraulic control conduit 97. After the nose wheel is firmly secured and each actuator 44 is at the clamping pressure Pe, piston rod clamps 44a are released by opening control valve 98 to depressurize control conduit 97. The piston rods of hydraulic actuators 44 are thereby clamped or locked in place and nose wheel 4 remains firmly secured, even in the event of a pressure loss in the hydraulic system.

To release and lower the nose wheel the abovedescribed operations are essentially reversed. The driver of the towing vehicle shifts lever 73 to its nose wheel lowering position. This opens valve 98 and pressurizes hydraulic control conduit 97, thereby releasing piston rod clamps 44a. After a short delay valve 75 is operated so that pressurized fluid from conduit 67 flows into hydraulic line 79 while spent fluid from line 77 drains into line 69. Pressurized hydraulic fluid enters the cylinders of actuators 44 from line 79 and retracts the lifter, thereby lowering the nose wheel from ramp 10. Hydraulic fluid on the other side of the piston returns via a check valve 96 and lines 77 and 67.

During this phase of the operation the pressure in line 79 is lower than the threshold pressure of pressure valve 99, thus preventing the flow of pressurized fluid to hydraulic motors 57. Consequently the lifters 40 are locked into their operating positions as the nose wheel is lowered as a result of the relative dimensioning of links 58, 69 described above and shown in FIG. 4. When the actuators 44 have completed their return strokes the pressure in line 79 increases. This opens valve 99 to permit the flow of pressurized fluid to the hydraulic motors 57. The motors rotate, thereby pivoting the lifters 40 about axis 41 through 90 degrees into their retracted position.

It is clear from the above that the fully hydraulically controlled, automatic system of the present invention requires no human intervention. Thus, it is protected against the most common human errors.

During the nose wheel engaging operation described above hydraulic actuators 28 are most of the time pressureless, allowing holders 20 to move freely with the nose wheel. In a first position of control valve 76 shown in FIG. 8, pressurized hydraulic fluid from a pressure relief valve 62 flows via this control valve 76, a second relief valve 64 and a check valve 66 to the piston rod side of the cylinder of actuator 28. In this sequence the second relief valve 64 restricts the level of pressure flow to, for example, a very low 6 bars, to only slightly prestress the holder 20. Lifter 40 can readily overcome the force generated thereby. As the piston rod of actuator 28 is extended when the nose wheel rides up ramp 10, hydraulic fluid exists from the piston rod of the cylinder via a further relief valve 68, set e.g. at 8 bars, and control valve 76 from where it flows into return line 69.

After the nose wheel engaging operation is completed, ramp 10 has activated limit switch S1, and the increased pressure in actuator 44 triggers pressure switch 89, switch unit 91 generates a signal that reverse the setting of control valve 76. Pressurized fluid now flows through line 67 past the first relief valve 62 and a check valve 72 into hydraulic actuator 28. The hydraulic pressure at relief valve 62 is set to equal the clamping pressure Pe, e.g., 85 bars. The holders in turn are now subjected to a clamping force of a predetermined magnitude determined by the magnitude of pressure Pe discussed above. A pressure switch 82 set for a threshold pressure which equals pressure Pe reverses a shutoff valve 84 to thereby retain the hydraulic fluid in actuator 28 at pressure Pe. This completes the securing phase.

Each actuator 28 is fitted with a well known piston rod clamp 28a which is disengaged by pressurized hydraulic fluid from control line 97 and which is activated at the completion of each nose wheel engaging operation by operating control valve 98. In its activated condition the piston rod clamps 28a oppose any further extension of the piston rods although the clamps do not oppose the further retraction of piston rods. If, when the piston rod clamps 28a are activated, the grip on nose wheel slackens, for example as a result a sudden loss of tire pressure, the holders move slightly, which results in an immediate, sharp pressure drop in the actuators 28. This pressure drop is sensed by a sensor 94 which signals a malfunction or generates an alarm signal. The signal warns the driver of the towing vehicle that the nose wheel is no longer properly secured and that it is unsafe to continue towing.

We claim:

1. An aircraft towing vehicle comprising a vehicle frame constructed to be maneuvered about a surface in forward and aft directions, the frame including a generally U-shaped, rearwardly open recess formed to receive an aircraft nose wheel therein;

a ramp carried by the frame and positioned at a forward end of the recess for receiving and supporting the nose wheel;

a lifter having a lower segment and an upper segment for engaging an aft portion of the nose wheel and moving the nose wheel onto the ramp;

lifter support means pivotably mounted to the vehicle frame for moving the lifter in a generally forward direction towards the aft portion of the nose wheel;

means connecting the lifter to the lifter support means and permitting pivotal movements of the lifter relative to the lifter support means about a generally horizontal axis;

power drive means operatively coupled with the lifter for moving the lifter relative to the frame and applying a forwardly directed force to the aft portion of the nose wheel and thereby move the nose wheel in a forward direction onto the ramp;

control means operatively coupled with the lifer and causing pivotal movements of the lifter relative to the lifter support means about the horizontal axis when the power drive means moves the lifter so that during an initial phase of such movement the lower segment travels relatively farther in the forward direction and during a final phase of such movement the upper segment travels relatively farther in the forward direction; and whereby, during the initial movement phase, the lower lifter segment engages the nose wheel and facilitates the movement of the nose wheel onto the ramp and during and after the final phase of the movement the upper lifter segment firmly secures the nose wheel to the ramp and thereby to the towing vehicle.

2. An aircraft towing vehicle according to claim 1 wherein the lifter support means is pivotable relative to the vehicle frame about a substantially upright axis.

3. An aircraft towing vehicle according to claim 1 wherein the upper lifter segment is fixed and rotationally immovable relative to the control means, and including means mounting the lower lifter segments for relative pivotal movements about a second horizontal axis.

4. A towing vehicle according to claim 3 wherein the second horizontal axis is relatively lower than the first mentioned horizontal axis.

5. A towing vehicle according to claim 1 wherein the upper and lower lifter segments are each defined by a set of multiple, parallel rollers.

6. A towing vehicle according to claim 1 and constructed to tow aircraft of predetermined types, and wherein the lifter has a vertical extent when in its operating position which is less than the diameter of the smallest aircraft nose wheel of the predetermined aircraft types and greater than one-half the diameter of the largest nose wheel of the predetermined aircraft types.

7. A towing vehicle according to claim 1 wherein a side of the lifter facing the nose has a generally concave configuration.

8. A towing vehicle according to claim 1 wherein the power drive means pivotably moves the lifter and the lifter support means in a forward direction towards and against the aft portion of the nose wheel.

9. An aircraft towing vehicle according to claim 1 wherein the means connecting the lifter includes a shaft, and wherein the control means comprises a control linkage mechanism including a plurality of pivotally interconnected links and a control arm, means pivotably connecting the control arm to the shaft for relative pivotal movements between the control arm and the shaft about a generally upright axis, the control linkage being further pivotally coupled to the vehicle frame and dimensioned so that the shaft pivotally moves relative to the lifter support to effect relative faster forward movements of the lower lifter segment and the upper lifter segment during the initial and final phases of the lifter forward movement, respectively.

* * * * *